(12) United States Patent
Iwata et al.

(10) Patent No.: US 6,378,368 B1
(45) Date of Patent: Apr. 30, 2002

(54) OSCILLATION GYRO EQUIPPED WITH THIN PZT FILM

(75) Inventors: Hitoshi Iwata; Koichi Itoigawa, both of Aichi (JP)

(73) Assignee: Kabushiki Kaisha Tokai Rika Denki Seisakusho, Aichi-ken (JP)

(*) Notice: Subject to any disclaimer, the term of this patent is extended or adjusted under 35 U.S.C. 154(b) by 0 days.

(21) Appl. No.: 09/367,894

(22) PCT Filed: Oct. 6, 1998

(86) PCT No.: PCT/JP98/04498
§ 371 Date: Aug. 18, 1999
§ 102(e) Date: Aug. 18, 1999

(87) PCT Pub. No.: WO99/19688
PCT Pub. Date: Apr. 22, 1999

(30) Foreign Application Priority Data

Oct. 9, 1997 (JP) .............................................. 9-277183

(51) Int. Cl.[7] ................................................. G01P 9/04
(52) U.S. Cl. ................................ 73/504.14; 73/504.12; 310/329
(58) Field of Search ...................... 73/504.12, 504.13, 73/504.14, 504.15, 504.04, 504.03, 504.02; 310/311, 321, 329, 331

(56) References Cited

U.S. PATENT DOCUMENTS 6,109,104 A * 8/2000 Fukuda et al. ............ 73/504.13

FOREIGN PATENT DOCUMENTS

| JP | 2-218913 | | 8/1990 |
| JP | 09079860 | | 3/1997 |
| JP | 10-206162 | * | 8/1998 |
| JP | 11-2527 | * | 1/1999 |
| JP | 11014370 | | 1/1999 |
| JP | 11-118490 | * | 4/1999 |
| JP | 11-344341 | * | 12/1999 |

* cited by examiner

*Primary Examiner*—Helen Kwok
(74) *Attorney, Agent, or Firm*—Robert D. Buyan; Stout, Uxa, Buyan & Mullins, LLP (57) ABSTRACT

An oscillation gyro (1) including a stainless steel base member (4) which is a quadratic prism, wherein the base member (4) has through holes (10, 7) extending in the directions crossing at right angles at the upper and lower portions thereof respectively, and further includes slide plates (8, 9) constituting a parallel plate portion (2) and slide plates (10, 11) constituting a parallel plate portion (3). Preferably, a titanium film (13) is formed by sputtering on each of the outer side surfaces of the parallel plate portions (2, 3), and a thin PZT film (14) is formed on the entire outer surface of the titanium film (13). Pairs of electrode films (15, 16) of aluminum are formed on the respective thin PZT films (14) up and down. The respective electrode films (15, 16) have a thickness of several um and the same area. Pads (15b, 16b) are formed at the lower ends of the base member (4) serving as fixed ends, and are connected to extension portions (15a, 16a) extending from the electrode film (15). Lead wires (19) connected to the pads (15a, 16a) suppress a change in the rigidity of the parallel plate portions (2, 3) caused by the connection of lead wires.

9 Claims, 5 Drawing Sheets

(PRIOR ART)

Fig. 8

(PRIOR ART)

Fig. 9

(PRIOR ART)

OSCILLATION GYRO EQUIPPED WITH THIN PZT FILM

BACKGROUND OF THE INVENTION

The present invention relates to oscillation gyroscopes having PZT (lead (Pb) Zirconate Titanate) thin films.

Figure 8:
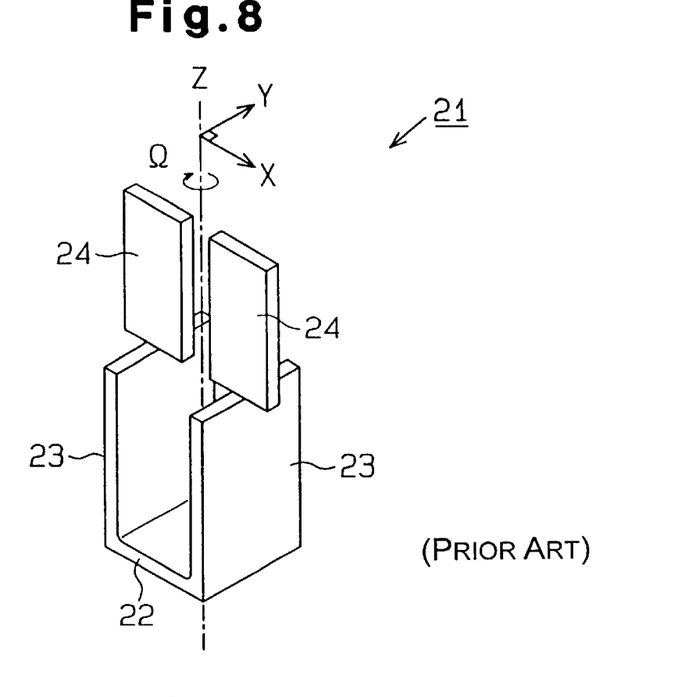
FIG. 8 is a perspective view showing a prior art tuning-fork type oscillation gyroscope.
Figure 9:
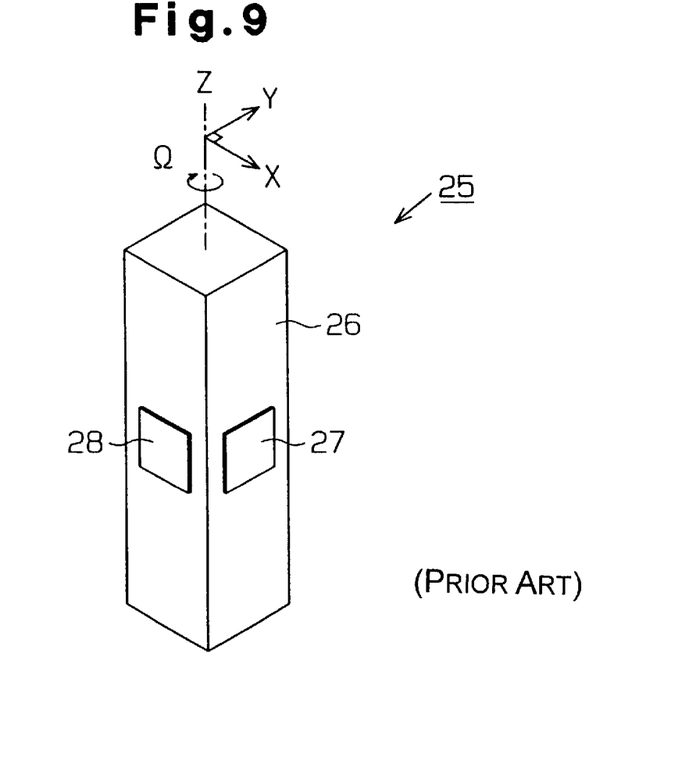
FIG. 9 is a perspective view showing a prior art vibrating reed type gyroscope.

A conventional tuning-fork type oscillation gyroscope is shown in FIG. 8, while a vibrating reed type gyroscope is shown in FIG. 9. As shown in FIG. 8, the tuning-fork type oscillation gyroscope 21 includes a pair of driving piezoelectric ceramic plates 23, which are arranged on the ends of a connection plate 22. The piezoelectric ceramic plates 23 are parallel to each other and their planes are normal to the X-axis. A detecting piezoelectric ceramic plate 24 is formed integrally with each piezoelectric ceramic plate 23 extending upward from the top center of the ceramic plate 23. The ceramic plates 24 lie in a plane normal to the Y-axis. The X-axis and the Y-axis are perpendicular to each other.

When an alternating voltage is applied to the piezoelectric ceramic plates 23, the piezoelectric ceramic plates 23 oscillate in the direction of X-axis. If torque is applied to the oscillation gyroscope 21 about the Z-axis, the piezoelectric plates 24 distort and produce a voltage corresponding to the distortion. The voltage is detected to obtain the force applied to the piezoelectric plates 24. The force is referred to as Coriolis force Fc and is generally represented by the following formula (1):

$$Fc = 2mV \times \Omega \quad (1)$$

In the formula, m indicates the mass of the oscillation gyroscope 21, V indicates the vibrational speed, and $\Omega$ indicates the angular velocity of the oscillation gyroscope 21 about the Z-axis. The angular velocity $\Omega$ is obtained when the mass m, the vibrational speed V, and the force Fc have been obtained.

As shown in FIG. 9, a vibrating reed type oscillation gyroscope 21 includes a rectangular column-like vibrating reed type vibrator 26, which is made of a constant elasticity metal. A pair of driving piezoelectric ceramic plates 27 (only one shown in the drawing) are adhered to opposing side surfaces, which are separated by 180 degrees, of the vibrator 26. A pair of detecting piezoelectric ceramic plates 28 are adhered to the remaining two side surfaces (only one shown in the drawing). The application of an alternating voltage to the piezoelectric ceramic plates 27 vibrates the vibrating reed type vibrator 26 in the X-axis direction. When torque is applied to the oscillation gyroscope 21 about the Z-axis, the detecting piezoelectric ceramic plates 28 distort and generate a voltage corresponding to the distortion. The voltage is detected to obtain the Coriolis force applied to the piezoelectric ceramic plates 28.

The piezoelectric plates 23, 24, 27, 28 are formed from bulk PZT (lead zirconate/titanate, or ceramics containing a solid solution of lead titanate and lead zirconate). However, it is difficult to form bulk PZT into thin components and thus difficult to reduce the entire size of the oscillation gyroscope.

Additionally, when adhering the piezoelectric ceramic plates 27, 28 to form the oscillation gyroscope like the vibrating reed type oscillation gyroscope 25, the adhering of the piezoelectric ceramic plates 27, 29 adds to the number of manufacturing steps. Furthermore, the adhering accuracy, or the precision of the adhering position is low. This affects the sensitivity of the oscillation gyroscopes 21, 25. Thus, it is difficult to manufacture oscillation gyroscopes having uniform accuracy. If the vibrator has a three-dimensional structure, it is difficult to attach the bulk PZT to an arbitrary location. This restricts the locations where the bulk PZT can be attached.

As apparent from formula (1), an increase in the mass m of the oscillation gyroscope increases the Coriolis force Fc. This increases the distortion amount of the detecting piezoelectric ceramics and increases the detecting voltage of the oscillation gyroscope. In other words, the detecting sensitivity of the oscillation gyroscope increases. It is thus preferred that the oscillation gyroscope have a greater mass to obtain a higher sensitivity. However, if the oscillation gyroscope employs bulk PZT, the mass cannot be increased unless the size of the substrate, which forms the bulk PZT, is increased. Hence, there is a limit to an increase in the sensitivity.

In addition, as apparent from formula (1), an increase in the vibrational speed V increases the Coriolis force Fc. This increases the distortion amount of the detecting piezoelectric ceramics and increases the detecting voltage of the oscillation gyroscope, which in turn, increases the detecting sensitivity of the oscillation gyroscope. However, for example, in the case of a vibrating reed type oscillation gyroscope, if the substrate of the bulk PZT is made thinner, the rigidity of the substrate decreases. Hence, the piezoelectric device is apt to twist and interfere with accurate oscillations. Furthermore, accurate detection is hindered when the detecting piezoelectric device is distorted and twisted.

Figure 7:
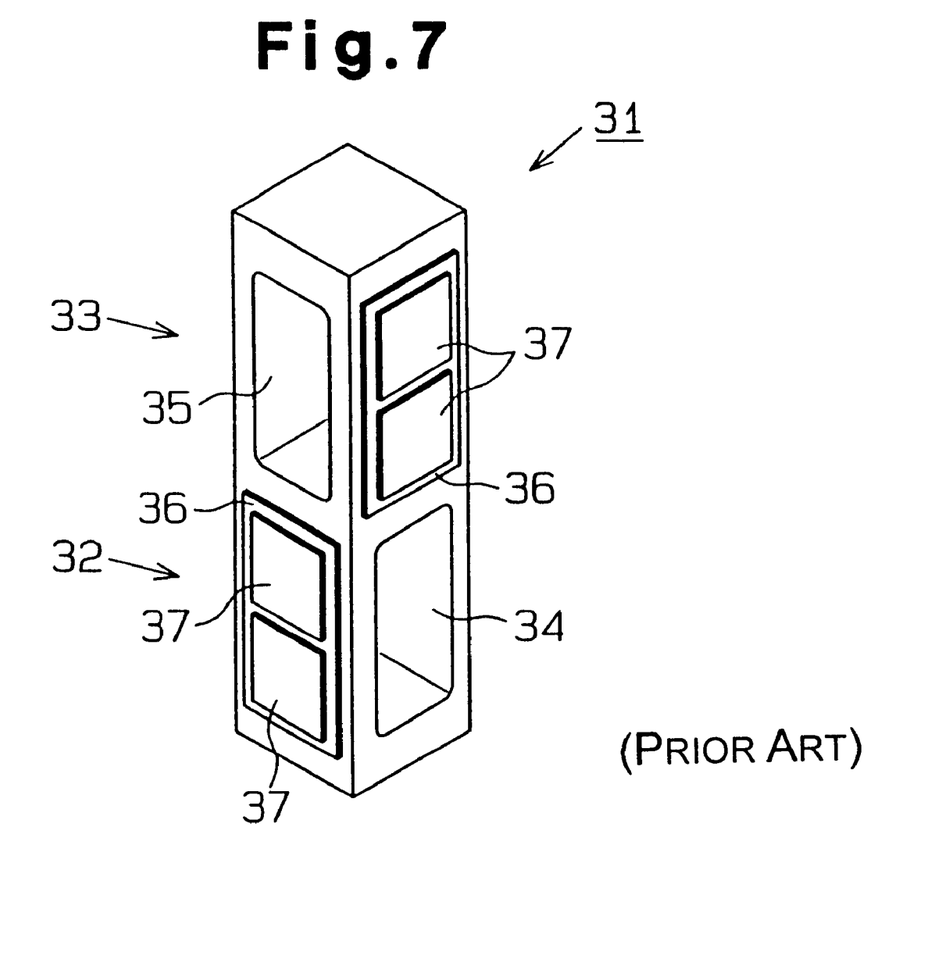
FIG. 7 is a perspective view showing a prior art oscillation gyroscope.

Accordingly, an oscillation gyroscope 31, which is compact, resists twisting, and increases sensitivity, has been proposed as shown in FIG. 7. The oscillation gyroscope 31 has a rectangular column-like shape and is made of an elastic metal. An opening 34 extends through the lower side (fixed side) of the gyroscope 31, while a perpendicular opening 35 extends through the upper side (free side) of the gyroscope 31. The gyroscope 31 has a first parallel plate portion 32 corresponding to the opening 34 and a second parallel plate portion 33 corresponding to the opening 35. Titanium films are formed on the surfaces of the first and second parallel plate portions 32, 33, while PZT thin films 36 are formed on the titanium films. A plurality of electrodes 37, preferably made of aluminum, are formed on each PZT thin film 36, with a lead wire (not shown) connected directly to each electrode 37. The first parallel plate portion 32 serves as a driving portion for producing vibrations, while the second parallel plate portion 33 serves as a detecting portion. Voltage is applied to the first parallel plate portion 32 to produce vibrations and cause the PZT thin films 36 of the second parallel plate portion 33 to generate a voltage, which is output via the lead wires (not shown) that are connected to the electrodes 37.

However, the connection of the lead wires changes the rigidity of the second parallel plate portion 33. This affects the output voltage generated by the PZT thin films 36. This leads to a shortcoming in which the detecting characteristics cannot be stabilized. The connection of the lead wires also affects the vibrating characteristics of the first parallel plate portion 32. This leads to a shortcoming in which the driving characteristic cannot be stabilized.

SUMMARY OF THE INVENTION

Accordingly, it is an objective of the present invention to provide an oscillation gyroscope having a PZT thin film with uniform characteristics.

To achieve the above objective, an oscillation gyroscope according to the present invention comprises a substrate made of an elastic metal and having a substantially rectangular shape, the substrate having first to fourth side surfaces arranged in the circumferential direction, wherein the first side surface and the third side surface, and the second side surface and the fourth side surface are located on opposite sides, the substrate having a fixed end for fixing the oscillation gyroscope, and a free end located on the opposite side of the fixed end, the substrate having a first opening extending from the first side surface to the third side surface at the fixed end side, a first parallel plate portion located on both sides of the first opening and having a pair of side plates including the second and fourth side surfaces, the substrate having a second opening extending from the second side surface to the fourth side surface at the free end side, a second parallel plate portion located on both sides of the second opening and having a pair of side plates including the first and third side surfaces, a titanium base surface formed respectively on the second and fourth side surfaces of the first parallel plate portion and the first and third side surfaces of the second parallel plate portion, a PZT thin film formed on each base surface, an electrode formed on each PZT thin film, and connecting pads electrically connected to either one of the electrodes of the PZT thin films.

DETAILED DESCRIPTION OF THE INVENTION

An oscillation gyroscope according to an embodiment of the present invention will now be described with reference to FIGS. 1 to 6. In the drawings, the thickness of titanium films, electrode films, and side plates are exaggerated for illustrative purposes.

Figure 1A:
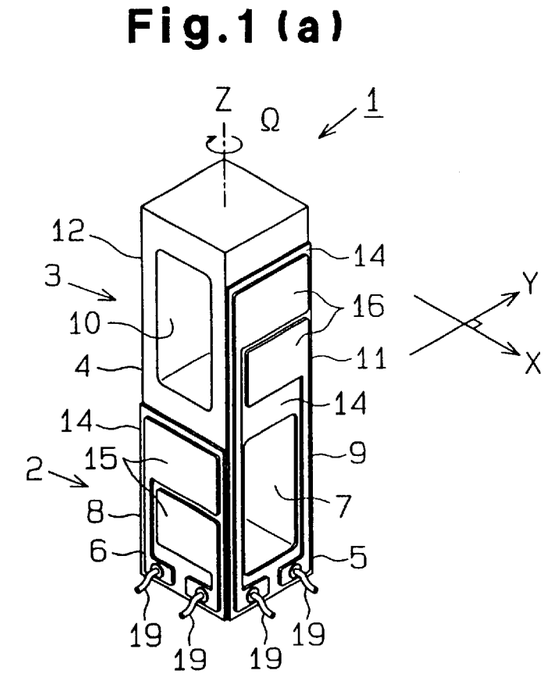
FIG. 1(a) is a perspective view showing an oscillation gyroscope according to an embodiment of the present invention.
Figure 1B:
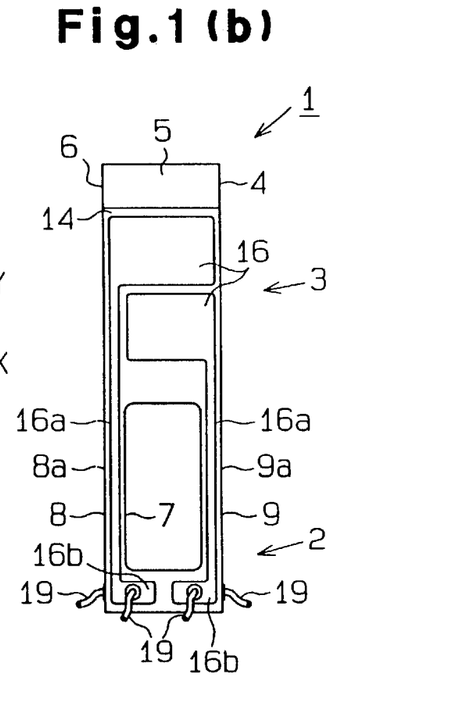
FIG. 1(b) is a side view showing the oscillation gyroscope of FIG. 1(a)

As shown in FIG. 1, an oscillation gyroscope 1 has a rectangular column-like shape and includes a lower parallel plate portion 2 and an upper parallel plate portion 3. The oscillation gyroscope 1 includes a rectangular column-like substrate 4, which is preferably made of an elastic steel material such as stainless steel. Although it is preferred that the substrate 4 have a square cross-section, the substrate 4 may be formed with a cross-section having other shapes. The substrate 4 has a first side surface 5 normal to the X-axis. A second side surface 6 is located adjacent to the first side surface 5, and a third side surface and a fourth side surface are subsequently designated in the clockwise direction (circumferential direction). The first side surface 5 and the third side surface are on opposite sides and are located 180 degrees apart from each other about the Z-axis, while the second side surface 6 and the fourth side surface are on opposite sides located 180 degrees apart from each other about the Z-axis (the drawings show only the first side surface 5 and the second side surface 6). Paired side surfaces (the first and third side surfaces and the second and fourth side surfaces) have the same structure. Hence, only the first side surface 5 and the second side surface 6 will be described.

An opening 7 extends along the X-axis direction from the first side surface 5 to the third side surface at the lower part of the substrate 4. The cross-sectional shape of the opening 7 is substantially rectangular. The opening 7 forms a pair of side plates 8, 9, which outer surfaces define the second side surface 6 and the fourth side surface, at the lower part of the substrate 4. Each side plate 8, 9 includes a thin section 8a, 9a, respectively, preferably having a thickness of several tens to several hundreds of micrometers. The side plates 8, 9 extending parallel to each other at the lower part of the substrate 4 define the lower parallel plate portion 2, which has a parallel plate structure.

An opening 10 extends along the Y-axis direction from the second side surface 6 to the fourth side surface at the upper part of the substrate 4. The cross-sectional shape of the opening 10 is substantially rectangular. The opening 10 forms a pair of side plates 11, 12, which outer surfaces define the first side surface 5 and the third side surface, at the upper part of the substrate 4. The side plates 11, 12 have the same thickness as the side plates 8, 9. The side plates 11, 12 extending parallel to each other at the upper part of the substrate 4 define the upper parallel plate portion 3, which has a parallel plate structure. The parallel plate portions 2, 3 are arranged so that the openings 7, 10 extend perpendicular to each other.

Titanium films 13, or base surfaces (FIG. 4), are formed on, preferably by sputtering, the second side surface 6 and the fourth side surface of the parallel plate portion 2 and the first side surface 5 and the third side surface of the parallel plate portions 2, 3. PZT thin films 14 (FIG. 5) having a thickness of several tens of micrometers are formed entirely on the titanium films 13.

Figure 6A:
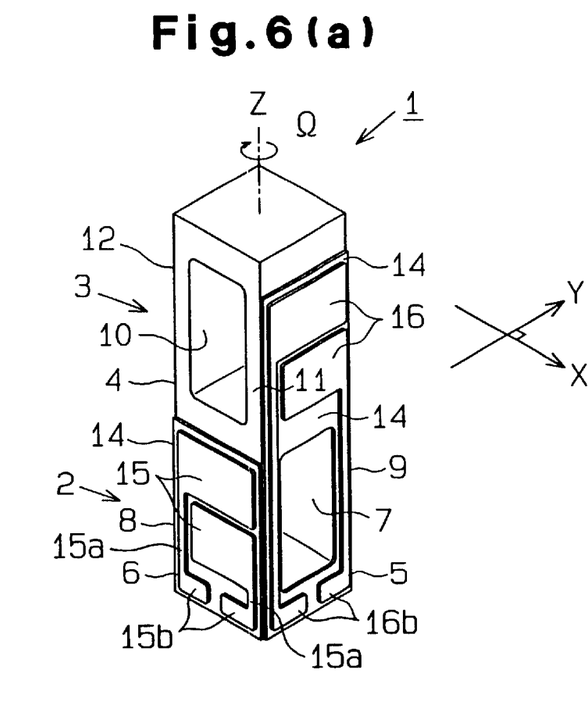
FIG. 6(a) is a perspective view showing the oscillation gyroscope according to an embodiment of the present invention on which electrode films are formed.

A pair of aluminum electrode films 15 are arranged vertically on the PZT thin films 14 of the second side surface 6 and the fourth side surface of the parallel plate portion 2 (FIGS. 1(a) and 6(a) show only those of the second side surface 6). Each electrode film 15 has a thickness of several micrometers and has substantially the same area. As shown in FIG. 6(a), a pair of bridges 15a extend along the edges of the second side surface 6 and the fourth side surface downward from and integrally with each electrode film 15. A pair of aluminum pads lsb are formed integrally with the bridges 15a on the second side surface 6 and the four th side surface at the lower end portion (or fixed end portion) of the oscillation gyroscope 1 (FIGS. 1(a) and 6(a) show only those of the second side surface 6). The pads 15b are aligned laterally, have a thickness of several micrometers, and have substantially the same area.

A pair of aluminum electrode films 16 are arranged vertically on the PZT thin films 14 of the first side surface 5 and the third side surface of the parallel plate portion 3 (FIGS. 1 and 6 show only those of the first side surface 5).

Figure 6B:
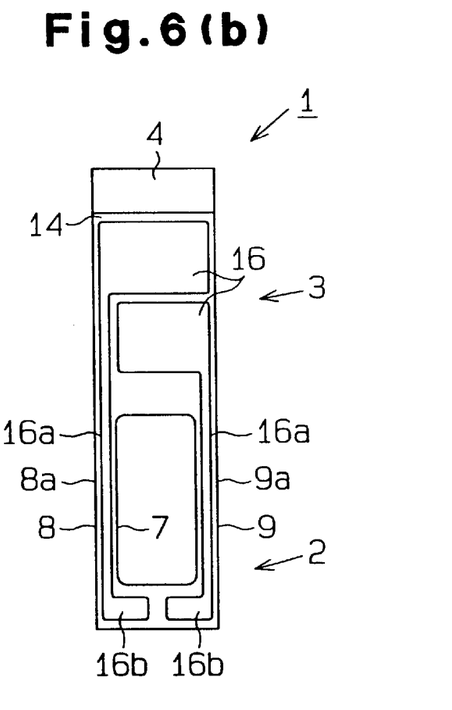
FIG. 6(b) is a side view of the oscillation gyroscope of FIG. 6(a)

Each electrode film 16 has a thickness of several micrometers and has substantially the same area. As shown in FIG. 6(b), a pair of bridges 16a extend along the edges of the first side surface 5 and the third side surface downward from and integrally with the electrode films 16. The bridges 16a are arranged along the thin sections 8a, 9a of the side plates 8, 9, respectively, in the parallel plate portion 2.

A pair of aluminum pads 16b are formed integrally with the bridges 16a on the first side surface 5 and the third side surface at the lower end portion, or fixed end portion, of the oscillation gyroscope 1 (FIGS. 1(b) and 6(b) show only those of the first side surface 5). The pads 16b are aligned laterally, have a thickness of several micrometers, and have substantially the same area. Instead of aluminum, the electrode films 15, 16, the bridges 15a, 16a, and the pads 15b, 16b may be formed of a conductive metal, such as Au (gold). A lead wire 19 is soldered to each pad 15b, 16b. In the present embodiment, the lower end portion of the oscillation gyroscope 1 serves as the fixed end portion, while the upper end portion serves as the free end portion.

The operation of the oscillation gyroscope 1 will now be described. When using the oscillation gyroscope 1, alternating voltages having opposite electric potentials are applied synchronously to the electrode films 15 of the side plates 8, 9 with the lower end portion of the substrate in a fixed state. If the polarity direction of the PZT thin films 14 is oriented toward the substrate 4 from the electrode film 15, the PZT thin film 14 is compressed when a positive potential is applied, and the PZT thin film 14 is expanded when a negative potential is applied. When the polarity is changed by the alternating voltage, the PZT thin film 14 is alternately expanded and contracted in a repetitive manner. As a result, the parallel plate portion 2 is driven in the X-axis direction or the negative X-axis direction. This oscillates the upper parallel plate portion 3 in the X-axis direction.

In the oscillating state, the application of torque to the oscillation gyroscope 1 about the Z-axis compresses one of the PZT thin films 14 in the parallel plate portion 3, and expands the other PZT thin film 14. The expansion and contraction distorts the two PZT thin films 14 and generates a voltage corresponding to the amount of distortion. The generated voltage is detected by way of the lead wires 19 to obtain the Coriolis force applied to the oscillation gyroscope 1. Furthermore, as shown in formula (1), the angular velocity $\Omega$ can be obtained using the detected force Fc if the mass m of the oscillation gyroscope 1 and the vibrational speed V have been obtained.

When using the oscillation gyroscope 1 as described above, since the lead wires 19 are connected to the pads 15b, which are arranged at the fixed end portion, the connection of the lead wires 19 does not change the rigidity of the parallel plate portion 2 and does not affect the oscillating characteristics of the parallel plate portion 2. Furthermore, since the lead wires 19 are also connected to the pads 16b, which are arranged at the fixed end portion, the connection of the lead wires 19 does not change the rigidity of the parallel plate portion 3 and does not affect the oscillating characteristics of the parallel plate portion 3.

Figure 2:
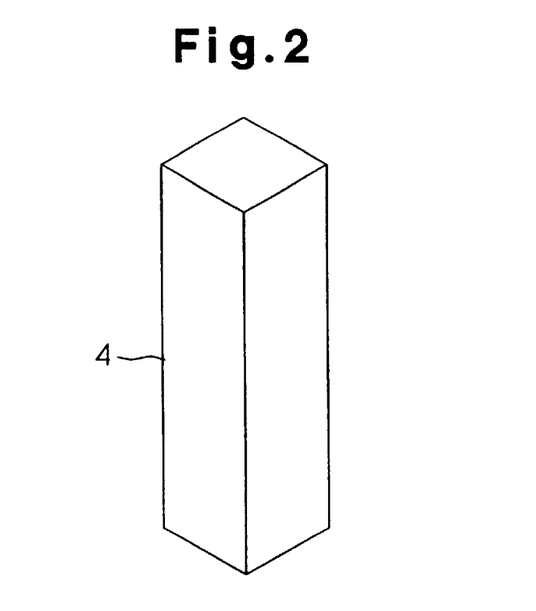
FIG. 2 is a perspective view showing a substrate of the oscillation gyroscope of FIG. 1(a)

A method of manufacturing the oscillation gyroscope 1 will now be described with reference to FIG. 2 to FIG. 6(b). As shown in FIG. 2, a substrate 4, which is preferably made of stainless steel, is first prepared. The substrate 4 has a rectangular column-like shape with a square cross-section.

Figure 3:
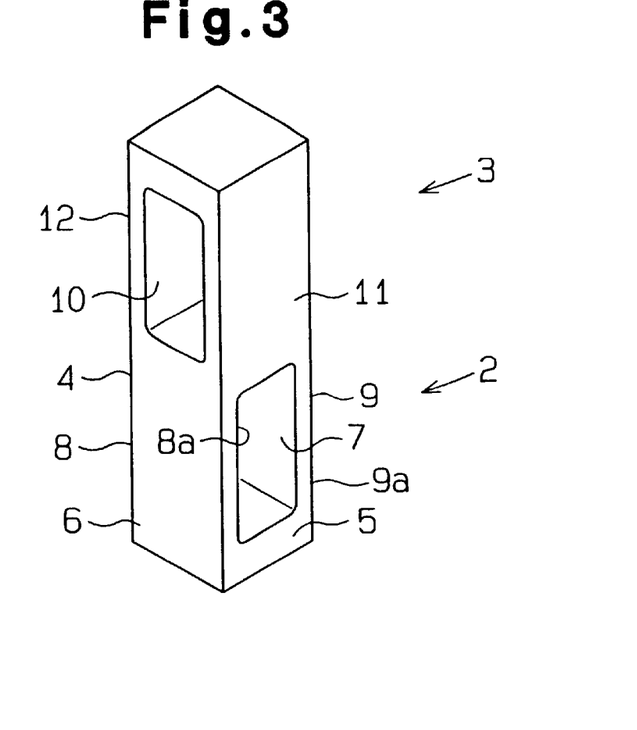
FIG. 3 is a perspective view showing the substrate of FIG. 2 with openings.

As shown in FIG. 3, openings 7, 10, which extend perpendicular to each other, are formed in the upper and lower parts of the substrate 4, respectively. The openings 7, 10 may be formed by machining, etching, or other appropriate ways.

The formation of the opening 7 defines a pair of side plates 8, 9 having a thickness of several tens to several hundreds of micrometers at the lower part of the substrate 4. The side plates 8, 9 define a parallel plate portion 2 having a parallel plate structure. The formation of the opening 10 defines a pair of side plates 11, 12 having a thickness of several tens to several hundreds of micrometers at the upper portion of the substrate 4. The side plates 11, 12 define a parallel plate portion 3 having a parallel plate structure.

Subsequently, the substrate 4 is cleaned with an agent, such as acid. A mask (not shown), which is made from a synthetic resin or a metal other than titanium using a physical film formation process, such as sputtering or vacuum deposition, is applied to the substrate 4 excluding portions on which the PZT thin films 14 are to be formed.

Figure 4:
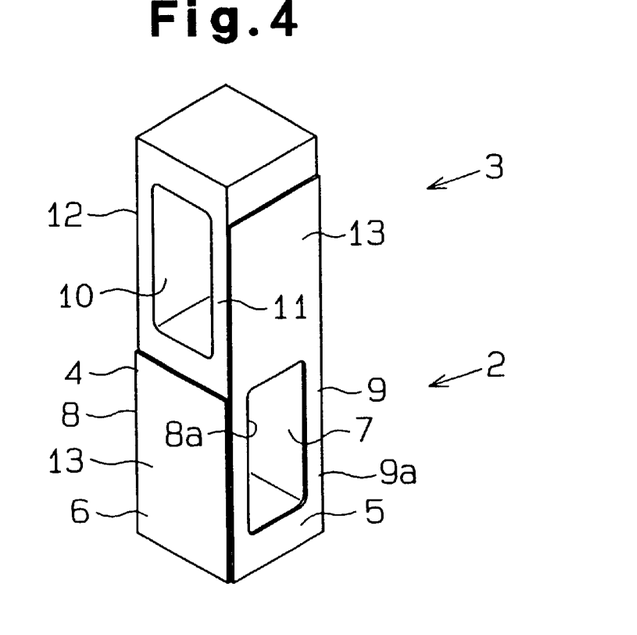
FIG. 4 is a perspective view showing the substrate of FIG. 3 on which titanium films are patterned.

As shown in FIG. 4, titanium films 13 are formed on the second side surface 6 and the fourth side surface of the parallel plate portion 2 and the first side surface 5 and the third side surface of the parallel plate portions 2, 3 using a physical film formation process, such as sputtering or vacuum deposition.

Figure 5:
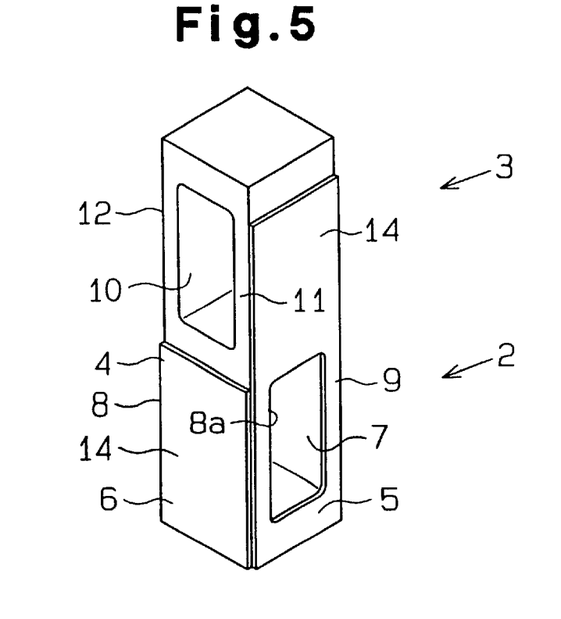
FIG. 5 is a perspective view showing the substrate of FIG. 4 on which PZT thin films are formed.

As shown in FIG. 5, PZT thin films 14 are formed on the titanium films 13 using a hydrothermal process. The hydrothermal process includes two stages.

[First Stage]

The substrate 4, raw material, which is an aqueous solution containing zirconium oxychloride ($ZrOCl_2 \cdot 8H_2O$) and lead nitrate ($Pb(NO_3)_2$), and a KOH(8N) solution are placed in a Teflon container (not shown) and agitated. The piezoelectric characteristic of the PZT thin films 14 is determined by the composition ratio of lead titanate and lead zirconate in the PZT thin films 14. Thus, the mol ratio between the zirconium oxychloride and the lead nitrate is determined in accordance with the piezoelectric characteristic of the PZT thin films 14, which are formed later.

Afterward, with the substrate 4 arranged at the upper portion of a pressure vessel (not shown), an aqueous solution containing zirconium oxychloride ($ZrOCl_2 \cdot 8H_2O$) and lead nitrate ($Pb(NO_3)_2$), and a KOH(8N) solution are mixed in the pressure vessel. The mixture is heated and pressurized while being agitated at a speed of 300rpm. Pressurizing refers to pressurizing using the vapor pressure of the heated solution. The treatment is continued for 48 hours at a temperature of 150° C. Consequently, PZT seed crystals (crystal nucleus) are formed on the surfaces of the titanium films 13 in a supersaturated state. After the formation of the seed crystals, the substrate 4 is removed from the pressure vessel, washed with water, and dried.

[Second Stage]

Subsequently, the substrate 4, on which the seed crystals are formed, raw material, which is an aqueous solution containing zirconium oxychloride ($ZrOCl_2 \cdot 8H_2O$) and lead nitrate ($Pb(NO_3)_2$), a solution containing titanium tetrachloride ($TiCl_4$) and (KOH(4N) are placed in a Teflon container (not shown) and agitated. The mol ratio between zirconium oxychloride, titanium tetrachloride, and lead nitrate is determined in accordance with the piezoelectric characteristic of the PZT thin films 14.

Then, with the substrate 4 arranged at the upper portion of a pressure vessel (not shown), an aqueous solution containing zirconium oxychloride ($ZrOCl_2 \cdot 8H_2O$) and lead nitrate ($Pb(NO_3)_2$), and a solution containing titanium tetrachloride ($TiCl_4$) and KOH(4N) are mixed in the pressure vessel, and heated and pressurized while being agitated at a speed of 300 rpm. Pressurizing refers to pressurizing by the vapor pressure of the heated mixture. The treatment continues for 48 hours at a temperature of 120° C. Consequently, PZT thin films 14 having a predetermined thickness (in the present embodiment, several tens of micrometers) are formed on the outer surfaces of the two parallel plate portions 2, 3 of the substrate 4 in a supersaturated state (refer to FIG. 5). After the formation of the PZT thin films 14, the substrate 4 is removed from the pressure vessel, washed with water, and dried. Afterward, the mask is removed.

As shown in FIGS. 6(*a*) and (*b*), a physical film formation process, such as sputtering or vacuum deposition, that preferably uses aluminum is carried out to form aluminum films on the PZT thin films 14. The aluminum film is then patterned to remove unnecessary sections in order to form the pairs of electrode films 15, 16, bridges 15*a*, 16*a*, and pads 15*b*, 16*b*. The production of the oscillation gyroscope is completed after execution of these stages. Lead wires 19 are then soldered to the pads 15*b*, 16*b*.

The oscillation gyroscope 1 of the present embodiment has the advantages described below.

The lead wires 19 are connected to the pads 15*b*, 16*b*, which are arranged on the fixed end portion of the oscillation gyroscope 1. Hence, the connection of the lead wires 19 does not change the rigidity of the parallel plate portion 2 and the oscillating and detecting characteristics of the oscillation gyroscope 1 are unaffected.

Since the PZT thin films 14 are thin and have a thickness of several tens of micrometers, the oscillation gyroscope 1 is compact.

In the present embodiment, the substrate 4 has parallel plate structures at both its upper and lower portions. This improves twist resistance. Accordingly, the oscillatory driving parallel plate portion 2 oscillates accurately and the detecting parallel plate portion 3 deforms accurately. This improves the anti-noise property and allows for accurate detection.

In the present embodiment, the titanium films 13 and the PZT thin films 14 are formed using a hydrothermal process. Therefore, oscillation gyroscopes 1, which include oscillatory driving parallel portions 2 and detecting parallel plate portions 3 that are formed in the same stage (of the hydrothermal process), are manufactured having constant, or uniform, quality with regard to sensitivity, or the like. Furthermore, the hydrothermal process forms the driving PZT thin films 14 and the detecting PZT thin films 14 simultaneously. This reduces the number of manufacturing steps in comparison with forming the driving and detecting PZT thin films separately.

In the present embodiment, the connecting portion that connects the upper part of the side plate 11 and the side plate 12 in the detecting parallel plate portion 3 and the connecting portion that connects the part between the parallel plate portion 2 and the parallel plate portion 3 are included in the mass m of the Coriolis force Fc of the formula (1). Accordingly, the mass m of the oscillation gyroscope is adjusted as required by changing the mass of the connecting portions. This improves the detecting sensitivity of the oscillation gyroscope 1.

The embodiment according to the present invention may be modified as described below.

The thickness of the electrode films 15, 16, the bridges 15*a*, 16*a*, the pads 15*b*, 16*b*, the PZT thin films 14, and the substrate 4 is not limited to the values described above and may be changed as desired.

In the above embodiment, a physical film formation process, such as sputtering or vacuum deposition, is used to form the electrode films 15, 16, the bridges 15*a*, 16*a*, and the pads 15*b*, 16*b*. However, a screen printing method, which employs a conductive paste, may be used instead.

The present invention is embodied in a vibrating reed type gyroscope 1. However, the present invention may also be embodied in a tuning-fork type oscillation gyroscope in which an oscillation gyroscope 1 is fixed to each end of a connecting plate. In this case, the tuning type oscillation gyroscope is formed by merely arranging a pair of the oscillation gyroscopes 1 on the ends of the connecting plate.

Pairs of the electrode films 15, 16 are formed in the present embodiment. However, the PZT thin film 14 may be provided with only one electrode film.

In the present embodiment, the lead wires 19 of the two parallel plate portions 2, 3 are connected to the pads 15*b*, 16*b*, which are located at the lower end portion, which is the fixed end portion. However, the lead wires 19 for the parallel plate portion 2 may be connected to the pads 15*b* and the lead wires 19 for the other parallel plate portion 3 may be connected directly to the electrode films 16. In this case, undesirable effects that may be caused by the connection of the lead wires 19 are prevented.

On the other hand, the lead wires 19 for the parallel plate portion 3 may be connected to the pads 16*b* and the lead wires 19 for the parallel plate portion 2 may be connected directly to the electrode films 15. In this case, undesirable effects that may be caused by the connection of lead wires 19 are prevented.

In the present embodiment, the lower end portion of the oscillation gyroscope 1 is used as the fixed end portion. However, the upper end portion of the oscillation gyroscope 1 may be used as the fixed end portion and the lower end portion may be used as the free end portion. In this case, the upper end portion functions as the driving portion and the lower end portion functions as the detecting portion.

In the present embodiment, the substrate 4 is made from stainless steel. However, the substrate 4 may be made from other metals instead. If the substrate 4 is made from titanium, the titanium film 13 is not formed. In this case, the surface of the substrate 4 serves as the base surface.

What is claimed is:

1. An oscillation gyroscope comprising:

a substrate (4) made of an elastic metal and having a substantially rectangular shape;

the substrate (4) having first to fourth side surfaces arranged in a circumferential direction, wherein the first side surface (5) and the third side surface, and the second side surface (6) and the fourth side surface are located on opposite sides;

the substrate (4) having a fixed end for fixing the oscillation gyroscope, and a free end located on an opposite side of the fixed end;

the substrate (4) having a first opening (7) extending from the first side surface (5) to the third side surface at the fixed end;

a first parallel plate portion (2) located on both sides of the first opening (7) and having a pair of side plates (8, 9) including the second and fourth side surfaces;

the substrate (4) having a second opening (10) extending from the second side surface (6) to the fourth side surface at the free end;

a second parallel plate portion (3) located on both sides of the second opening (10) and having a pair of side plates (11, 12) including the first and third side surfaces;

a titanium base surface (13) formed respectively on the second and fourth side surfaces of the first parallel plate portion and the first and third side surfaces of the second parallel plate portion (3);

a PZT thin film (14) formed on each base surface (13);

an electrode (15, 16) formed on each PZT thin film (14); and a connecting pad (15b, 16b) electrically connected to any one of the electrodes (15, 16) of the PZT thin films (14).

2. The oscillation gyroscope according to claim 1 characterized by further comprising bridges (15a, 16a) connecting the electrodes (15, 16) to the associated pads (15b, 16b).

3. The oscillation gyroscope according to claim 2 characterized in that the bridges (16a) extend along the edges of the first and third side surfaces to connect the electrodes (16), which correspond to the second parallel plate portion (3), to the pads (16b) of the fixed end portion.

4. The oscillation gyroscope according to claim 2 characterized in that the bridges (15a) extend along the edges of the second and fourth side surfaces to connect the electrodes (15), which correspond to the first parallel plate portion (2), to the pads (15b) of the fixed end portion.

5. The oscillation gyroscope according to claim 2 characterized in that each side plate (8, 9, 11, 12) has a thin section and the bridges (15a, 16a) are formed on the thin sections.

6. The oscillation gyroscope according to claim 1 characterized in that each opening (7, 10) has a substantially rectangular cross-section.

7. The oscillation gyroscope according to claim 1 characterized in that each electrode (15, 16) and the associated pad (15b, 16b) are arranged on the same side surface of the substrate (4).

8. The oscillation gyroscope according to claim 1 characterized by further comprising another electrode (15, 16) formed on each PZT thin film (14) and another pad (15b, 16b) formed on the fixed end portion, wherein the two electrodes (15, 16) on each PZT thin film (14) are paired and have substantially the same area.

9. The oscillation gyroscope according to claim 1 characterized in that the substrate (4) further includes connecting portions for connecting the paired side plates (8, 9, 11, 12).

\* \* \* \* \*